United States Patent
Amsterdam et al.

(10) Patent No.: US 8,315,409 B2
(45) Date of Patent: Nov. 20, 2012

(54) MODIFICATIONS OF AUDIO COMMUNICATIONS IN AN ONLINE ENVIRONMENT

(75) Inventors: Jeffrey D. Amsterdam, Marietta, GA (US); Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 1085 days.

(21) Appl. No.: 12/211,435

(22) Filed: Sep. 16, 2008

(65) Prior Publication Data

US 2010/0067718 A1     Mar. 18, 2010

(51) Int. Cl.
 *H03G 3/00*     (2006.01)
(52) U.S. Cl. ............ 381/107; 381/61; 381/98; 381/101; 704/225
(58) Field of Classification Search .................. 381/107, 381/61, 98, 101–104
See application file for complete search history.

(56) References Cited

U.S. PATENT DOCUMENTS

| | | | |
|---|---|---|---|
| 5,880,731 A | 3/1999 | Liles et al. | |
| 6,577,306 B2 | 6/2003 | Matsuda | |
| 7,006,616 B1 | 2/2006 | Christofferson et al. | |
| 7,567,656 B2 * | 7/2009 | Yoshitani | 379/93.09 |
| 2001/0044725 A1 | 11/2001 | Matsuda et al. | |
| 2004/0075677 A1 | 4/2004 | Loyall et al. | |
| 2004/0253981 A1 * | 12/2004 | Blume et al. | 455/552.1 |
| 2005/0249367 A1 | 11/2005 | Bailey | |
| 2006/0025216 A1 | 2/2006 | Smith | |
| 2007/0003072 A1 * | 1/2007 | Ward et al. | 381/71.1 |
| 2007/0168359 A1 | 7/2007 | Jacob et al. | |
| 2007/0293188 A1 * | 12/2007 | Houghton et al. | 455/404.2 |
| 2009/0074209 A1 * | 3/2009 | Thompson et al. | 381/107 |
| 2009/0187405 A1 * | 7/2009 | Bhogal et al. | 704/246 |

FOREIGN PATENT DOCUMENTS

JP         2000113218         4/2000

* cited by examiner

*Primary Examiner* — Kimberly Rizkallah
*Assistant Examiner* — Mark A Laurenzi
(74) *Attorney, Agent, or Firm* — William Schiesser; Roberts Mlotkowski Safran & Cole, P.C.

(57) ABSTRACT

A system and method to modify audio communications in an online environment and, in particular, to modifying audio communications using one or more parameters. The system includes a module configured to detect one or more parameters applicable to an incoming audio communication and a weighing engine configured to weigh the one or more parameters and obtain a weighted volume. The system further includes a module configured to transmit the weighted volume to a user participating in a virtual universe. The method determines whether one or more parameters apply to an incoming communication, weighs the incoming communication based on the one or more parameters to determine a weighted volume of the incoming communication, and transmits the incoming communication to a user at the weighted volume.

12 Claims, 5 Drawing Sheets

MODIFICATIONS OF AUDIO COMMUNICATIONS IN AN ONLINE ENVIRONMENT

FIELD OF THE INVENTION

The invention generally relates to a system and method to modify audio communications in an online environment and, in particular, to modifying audio communications using one or more parameters.

BACKGROUND OF THE INVENTION

A virtual universe (VU) is an interactive simulated environment accessed by multiple users through an online interface. Users inhabit and interact in the VU via avatars, which are a user's representation of himself or herself. These representations can be in the form of a three-dimensional model, a two-dimensional icon, a text construct, a user screen name, etc. Although there are many different types of VUs, there are several features many VUs generally have in common. These features include, for example, Shared Space: the VU allows many users to participate at once;
Graphical User Interface: the VU depicts space visually, ranging in style from 2D "cartoon" imagery to more immersive 3D environments;
Immediacy: interaction takes place in real time;
Interactivity: the VU allows users to alter, develop, build, or submit customized content;
Persistence: the VU's existence continues regardless of whether individual users are logged in; and
Socialization/Community: the VU allows and encourages the formation of social groups such as teams, guilds, clubs, cliques, housemates, neighborhoods, etc.

As VUs become more complex and processing power, memory storage, and bandwidth increase, the number of ways in which users can communicate with one another in a VU has increased. For example, instead of relying on textual conversations, users can now audibly speak with one another while participating within a VU. This is particularly convenient during business meetings, lectures, and social gatherings within a VU.

As VUs increase in popularity the number of residents in a virtual location at any given time has increased. Understandably, this increase has resulted in an increase in audio communications. Currently these audio communications are being transmitted within VU regions at the same volume regardless of the source of the communication, how far the audio source is from the user, how many users are speaking at one time, etc. As such, an audio source ten feet away from a user may be heard at the same volume as an audio source two feet away from a user.

SUMMARY OF THE INVENTION

In a first aspect of the invention, a system comprises a module configured to detect one or more parameters applicable to an incoming audio communication and a weighing engine configured to weigh the one or more parameters and obtain a weighted volume. The system also comprises a module configured to transmit the weighted volume to a user participating in a virtual universe.

In another aspect of the invention, the method comprises determining whether one or more parameters apply to an incoming communication, weighing the incoming communication based on the one or more parameters to determine a weighted volume of the incoming communication, and transmitting the incoming communication to a user at the weighted volume.

In another aspect of the invention, a computer program product comprising a computer usable medium having readable program code embodied in the medium is provided. The computer program product includes at least one component to: determine an initial volume of an incoming communication; apply one or more parameters to the incoming communication, whereby the one or more parameters are configured to change the initial volume; determine a final volume based on the application of the one or more parameters; and transmit the incoming communication at the final volume.

In yet another aspect of the invention, a method for deploying an application for modifying audio communications, comprises providing a computer infrastructure being operable to: determine an initial volume of an incoming communication; determine a final volume of the incoming communication by adjusting the initial volume according to one or more factors, which are configured to be customized by a virtual universe or a user; and transmit the final volume to the user.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

The invention is directed to a system and method to modify audio communications in an online environment and, in particular, to modifying audio communications using one or more parameters. More specifically, the present invention allows a user or a VU to set parameters, which can be used to modify incoming audio communications. For example, a parameter can be set to modify incoming communications from a specific audio source and/or incoming communications from an audio source that is part of a VU or user defined group. Parameters may also be set to modify audio communications if the audio source is using an inventory item that is designed to modify an audio source's audio communications.

It should be understood by those skilled in the art that an audio source may comprise humans that are speaking, singing, humming, making noise in the background, playing music, etc. Additionally, an audio source may also comprise non-humans, such as automated system messages and/or communications from objects containing an audio component. For example, an object could be a virtual coffee house's public announcement system, which is configured to stream music to patrons. A user can select this music as their background music wherever they are in the VU.

Additional parameters may be used to modify an audio source's audio communications. For example, an audio source's communication may be modified to be louder or softer if the audio source is making a declaration or an alert is being communicated. An audio source's communication may also be modified based on how many audio sources are currently speaking and whether the audio source is interrupting a preexisting communication. Further embodiments may modify an audio source's communications based on how proximate the audio source is to the user. Embodiments may also set parameters to designate what audio channels should be used to transmit the communication to the user.

The user and/or a VU can assign a weight to one or more of the parameters. The weights are representative of the importance of each parameter and can be combined to determine a weighted volume of the audio communication. This weighted volume can be transmitted to a user. By utilizing one or more parameters and determining a weighted volume users can now customize incoming communications within a VU.

System Environment

Figure 1:
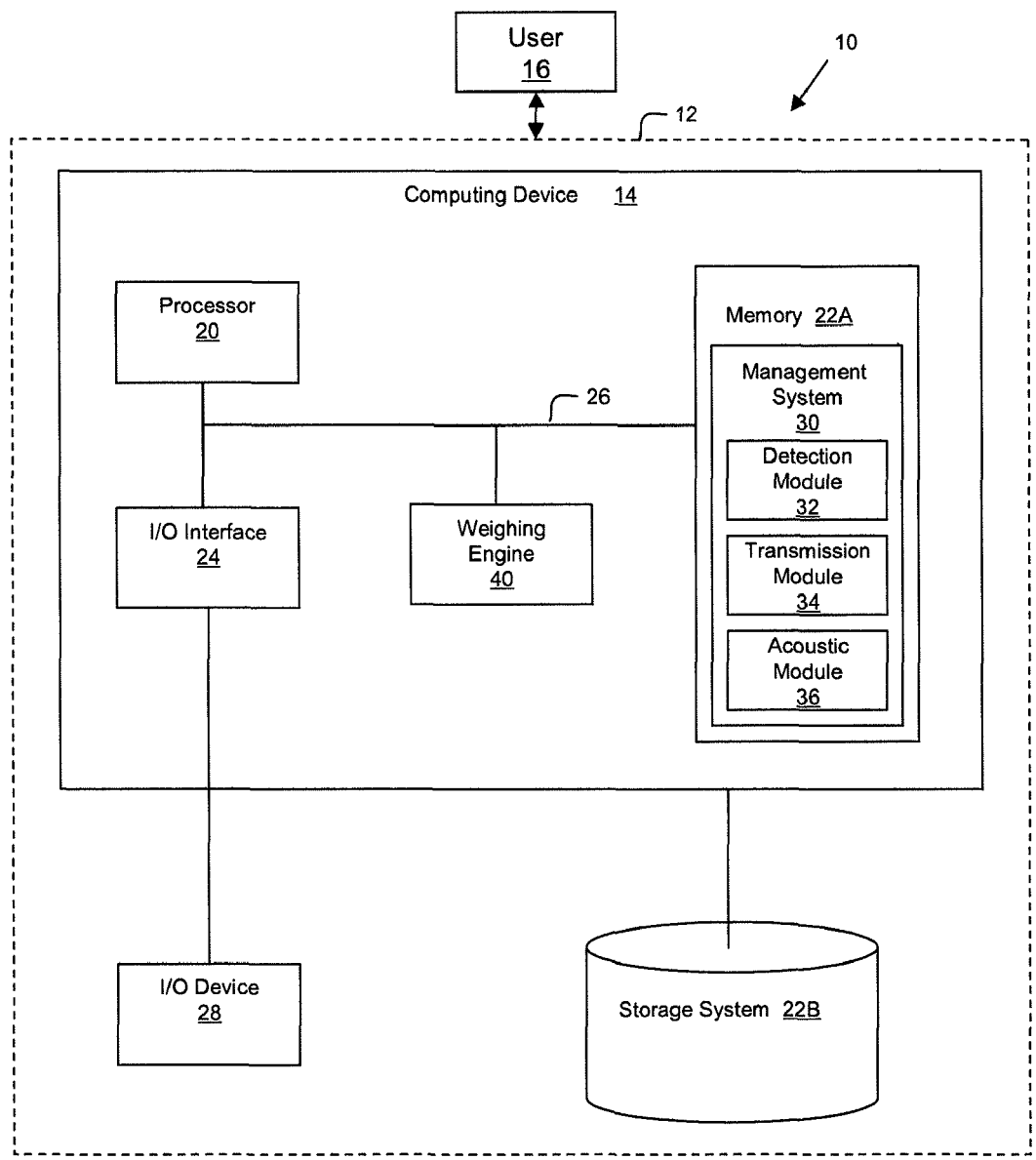
FIG. 1 shows an illustrative environment for implementing the steps in accordance with the invention.

FIG. 1 shows an illustrative environment 10 for managing the processes in accordance with the invention. To this extent, the environment 10 includes a server 12 that can perform the processes described herein. In particular, the server 12 includes a computing device 14, which may be in the form of a VU server system. The computing device 14 comprises a Management System 30, which may be embodied as a VU and stored in memory 22A. The Management System 30 is configured to make computing device 14 modify an audio communication. The audio modification can be performed in part by detecting one or more parameters that may be applicable to the audio modification, via a detection module 32, and transmitting a weighted volume to a user 16 via a transmission module 34. Pluggable acoustic modules 36 may also be used by the computing device 14 to modify audio communications.

The computing device 14 may further comprise a weighing engine 40, which is configured to weigh one or more parameters or inputs to obtain a weighted volume. The weighted volume is representative of how loudly an incoming communication is transmitted to a user 16 via an input/output (I/O) device/resource 28.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution.

The computing device 14 is in further communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be keyboards, displays, pointing devices, microphones, headsets, etc.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. In return, the service provider can receive payment from the customer(s) under a subscription and/or fee agreement and/or the service provider can receive payment from the sale of advertising content to one or more third parties.

Exemplary Implementation of the System

Figure 2:
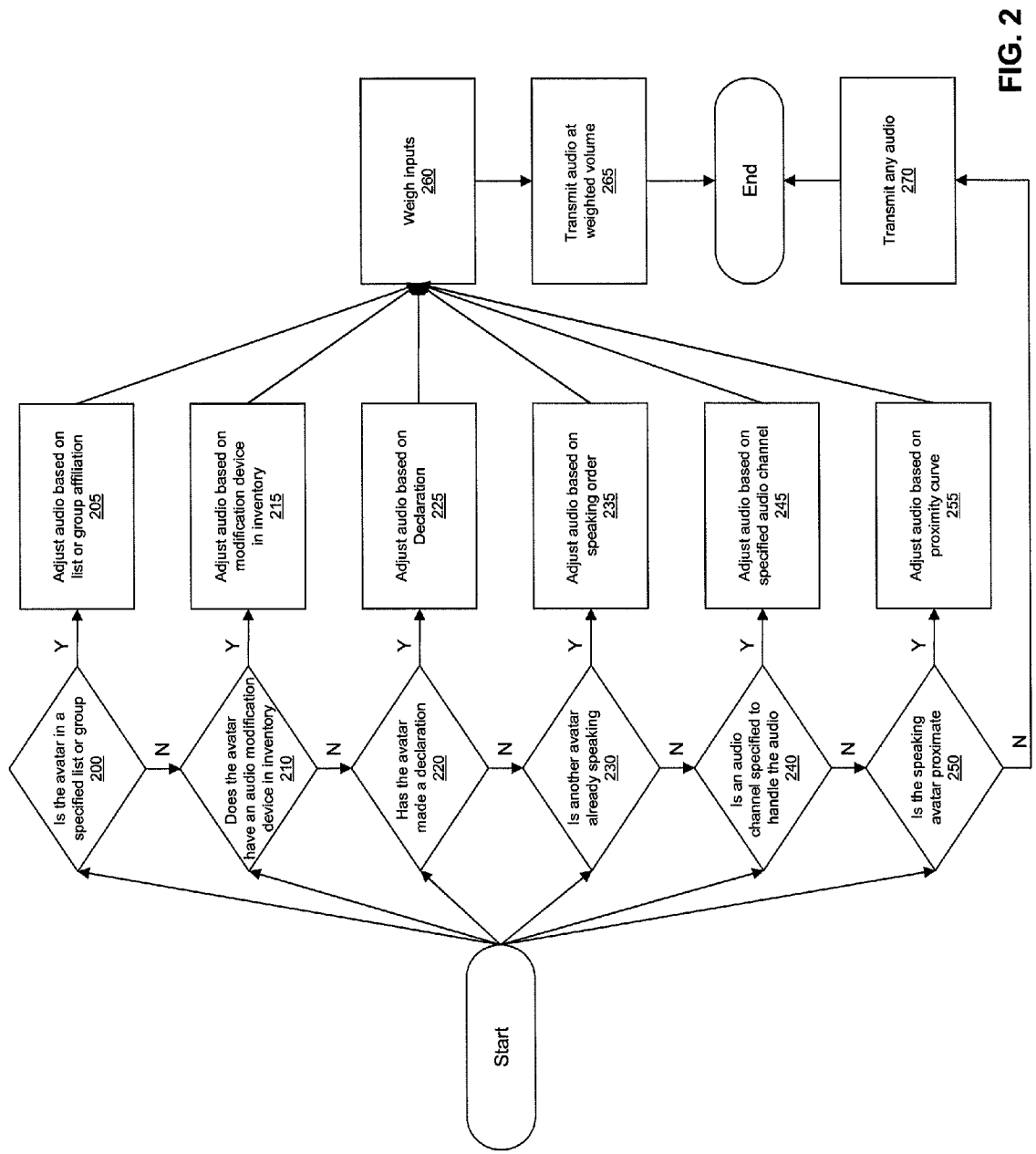
FIG. 2 shows a flow chart of an exemplary process in accordance with aspects of the invention.
Figure 3:
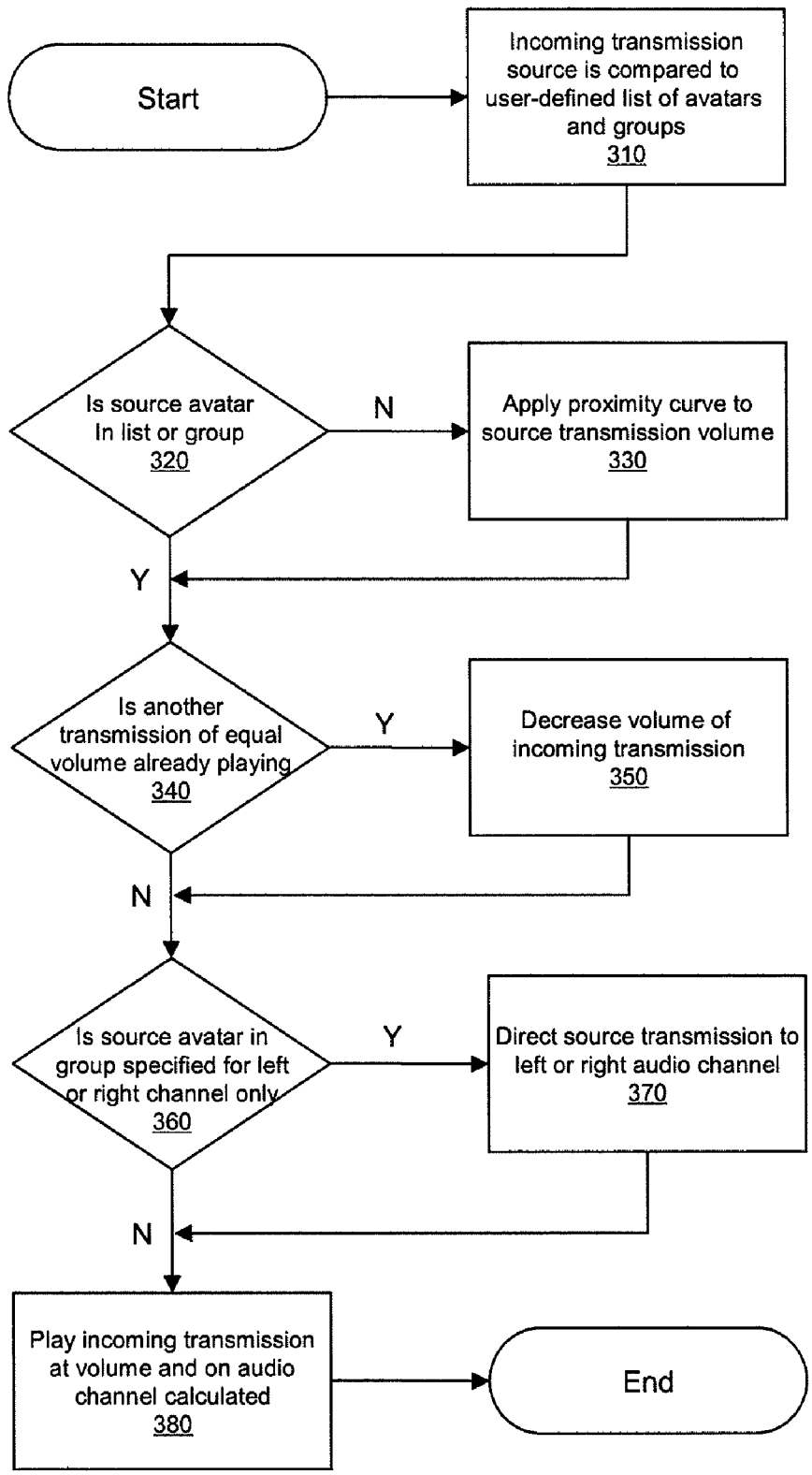
FIG. 3 shows a flow chart of an exemplary process in accordance with aspects of the invention.

FIGS. 2 and 3 are flow charts implementing steps of the invention, which may be implemented in the environment of FIG. 1. FIGS. 2 and 3 may equally represent a high-level block diagram of the invention. The steps of FIGS. 2 and 3 may be implemented and executed from either a server, in a client server relationship, or they may run on a user workstation (which can be generally represented in FIG. 1) with operative information conveyed to the user workstation to allow information to be presented to a user during content breakpoints. Additionally, the invention can take the form of an entirely hardware embodiment, an entirely software embodiment or an embodiment containing both hardware and software elements.

In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1, as should be understood and capable of implementation by those of skill in the art. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

FIG. 2 illustrates an exemplary process, which may be used to determine how loudly an incoming communication is transmitted to a user. This is determined by analyzing one or more parameters. These parameters may include, for example: a user and/or group identification parameter; an inventory item possession or display parameter; a user declaration parameter; a timing parameter; a listening device channel setting parameter; and/or a proximity parameter, etc. Each parameter can be used to increase, decrease, or maintain audio levels. This can be performed by determining whether a parameter is applicable and, if it is, adjusting the volume of the incoming communication. These adjustments may be done, e.g., by the weighing engine. All of the adjusted communications can then be weighed together by the weighing engine according to preset or user defined weights to determine how loudly the incoming communication is transmitted to the user.

More specifically, the user and/or group identification parameter may be analyzed at step 200, wherein a determination can be made as to whether an incoming communication is from a specific audio source who is listed on a user's list or from an audio source who is part of a group, which is included on the user's list. The list can be created by the VU based on a user's social networks. These networks may include avatars that the user is associated with through, e.g., school, work, etc. Lists may also be defined by the user. For example, a user can define a group wherein the user receives all communications from members within the group, no communications from members within the group, or communications only from select members within the group.

If the audio source is part of the user's list, the volume of the audio source's communications can be adjusted, at step 205. For example, the user may indicate that all communications from a member of the group be played at a certain decibel level, regardless of where the group member is located. Therefore, a group member in a completely different part of a VU may be heard as if the member was next to the user. Additionally, the user may choose to have all of the members within the group be heard at the same volume or at different volumes. For example, a user can create a group of members that the user does not want to be able to receive audio communications from, i.e., a muted group. Additionally, the user can create a group, or designate members within a group, that typically have a very loud voice or soft voice. This allows the user to automatically increase or decrease the decibel level of these members to normalize the volume of incoming communications. Once the adjustment has been made, the adjusted value can be sent to the weighing engine, at step 260.

The inventory item possession or display parameter can be analyzed at step 210, wherein a determination can be made as to whether an audio source is using an inventory item that would modify the volume of the audio source's communication. Exemplary inventory items may include megaphones, microphones, announcement devices, etc. If an audio source is using a voice modification device, then the volume of the audio source's communication can be adjusted according to the type of modification device used, at step 215. This modification may result in a louder communication or a softer communication. For example, if an audio source has a megaphone or a microphone then the audio source's voice can be adjusted to a louder volume.

The amount that an audio source's communication is adjusted can vary between embodiments. For example, an audio source communicating via a megaphone may increase the volume of the communication by 30 decibels whereas an audio source using a microphone may only be able to increase the volume of the communication by 20 decibels. The maximum and/or minimum amount that a communication can be adjusted may be a characteristic of the inventory item, predetermined by the VU, and/or set by the user. Once the adjustment has been made, the adjusted value can be sent to the weighing engine, at step 260.

The user declaration parameter can be analyzed at step 220, wherein a determination can be made as to whether an audio source has made a declaration, which can be used to modify the volume of the audio source's communication. A declaration can include, for example: pressing a designated key, typing a "shout" command; typing a "whisper" command; sounding an alert and/or warning; etc. Embodiments may also permit declarations to be in the form of music, additional audio sounds, and/or in the form of visual text, etc. For example, visual declarations can utilize text size, font, color, and/or blink rate, etc.

If a declaration has been made by the audio source then the volume of the communication is adjusted in accordance with the declaration, at step 225. For example, if the audio source types a "whisper" command then the audio source's communication can be adjusted a predetermined number of decibels. Similarly, if an audio source sounds an alert then the audio source's communication may be increased a predetermined number of decibels. This may be beneficial when an audio source, or even the VU itself, needs to be heard over multiple avatars. For example, a business may use an alert to inform users about special sales and/or offers within the VU. Once the adjustment has been made, the adjusted value can be sent to the weighing engine, at step 260.

The timing parameter can be analyzed at step 230, wherein a determination can be made as to whether a communication is already in progress, i.e., whether the incoming communication is interrupting an existing communication. If a communication is already in progress then the volume of the initial communication, interrupting communication, or all communications can be adjusted, at step 235. For example, if a communication is already in progress, then the user may choose to give preference to the initial communication by decreasing the volume of any interrupting incoming communications. Conversely, the user may give a preference to the possibly more important interrupting communication by decreasing the volume of the initial communication and/or increasing the volume of the interrupting communication. A user may also be able to designate which audio sources can interrupt communications and allow those interrupting communications to be transmitted at a higher volume than the initial communication.

Embodiments may allow the user to analyze how frequently an audio source interrupts existing communications and whether the interruptions are for good cause. If the audio source generally interrupts for good cause then the volume of the interrupting audio source's communication can be transmitted at a louder volume than the initial audio source. However, if the audio source's interruptions are generally not for good cause then the volume of the interrupting audio source's communication can be decreased in comparison to the initial audio source. Similarly, the user may allow the analysis and transmission control to be based on another user's analysis, such as by subscribing to the majority preference of all users, a group of users, or other users who have analyzed an audio source. This allows the user to avoid one or more overlapping communications with the same volume. Once the adjustment has been made, the adjusted value can be sent to the weighing engine, at step 260.

The listening device channel setting parameter can be analyzed at step 240, wherein a determination can be made as to whether a specific audio channel is designated to handle an incoming communication. Specific audio channels, such as a left, right, center, left rear, right rear, etc., can be designated by the user or by the VU. For example, a user can designate that audio communications within a certain range be directed to, e.g., a right rear channel. Users can also designate that audio communications from specific users or groups be directed to, e.g., a left channel. Based on these determinations, the incoming communications can be adjusted to be played from the designated audio channel, at step 245. Once the adjustment has been made, the adjusted value can be sent to the weighing engine, at step 260.

The proximity parameter may be analyzed at step 250, wherein a determination can be made as to how proximate the audio source is to the user. The proximity, or closeness, of the audio source can be measured according to standard measurements such as feet, yards, meters, etc. Embodiments may also measure proximity on a more relative scale, such as very close, close, far, farther, etc. Additionally, embodiments may measure proximity up to a maximum and/or minimum distance. For example, proximity may be measured only for audio sources within a specified perimeter, whereas, audio sources outside of the perimeter may not be measured or given a preset value.

The proximity of the audio source can be used to adjust the volume of an incoming communication according to a proximity curve, at step 255. A proximity curve attempts to mimic real life by transmitting communications from audio sources that are nearby at a higher volume than communications from audio sources that are farther away. A proximity curve can be applied to all incoming communications or a subset of communications designated by the user and/or a VU or applied to any of the embodiments of the present invention. Embodiments may allow the proximity curve to be created by the VU and/or by the user. Additionally, embodiments may also allow the proximity curve to be modified to, for example, limit or expand the perimeter covered by the proximity curve. Once the adjustment has been made, the adjusted value can be sent to the weighing engine, at step 260.

The weighing engine is configured to accept all of the adjustments that have been made to an incoming communication, at step 260. The weighing engine is designed to allow users to filter extraneous communications and focus on potentially important communications from both near and far sources. This beneficially eliminates excess communications that may occur from hearing all ongoing communications within a VU.

The weighing engine may weigh the inputs from steps 205, 215, 225, 235, 245, and 255 in a number of ways. For example, embodiments may allow the user to give a weight, or importance, to each of the inputs. Alternatively, embodiments may use a predetermined default weight, which is assigned to each of the inputs by the VU. In yet another embodiment, predetermined default weights may be applied by the VU and the user may be allowed to change one or more of the weights.

Embodiments may allow the same weight to be associated with each input or different weights to be associated with one or more of the inputs. Generally, the heavier the weight assigned to an input, the more important the input will become and, hence, louder. For example, a user may enter a zero weight for a first input and a heavy weight for a second input. Thus, the value obtained from the first input will not be considered by the weighing engine, whereas, the value from the second input will be considered heavily. Further embodiments may use alternative weighing schemes such as, e.g., assigning a higher importance to lower numerically weighted inputs. Once weights have been associated with each input, the weighing engine may calculate a weighted volume and assign it to the audio communication. This may be done, for example, by averaging all of the weighted inputs.

Embodiments may employ one or more alternative weighing methods. For example, embodiments may determine the weight associated with the first input. This weight can be used as a base weight, which can then be increased and/or decreased by subsequent input weights. Thus, an initial communication having a weighted volume of 100 decibels can be increased or decreased a specified number of decibels if, for example, the audio source interrupts an existing audio source.

In yet another embodiment, a base volume may be determined by the audio source. For example, a standard volume may be used as the base volume during normal communications. However, a higher or lower volume may be used as the base volume when an audio source has an inventory item, is making a declaration, etc. Once a base volume is determined, a proximity curve can be applied to the base volume. This can result in a range of volumes for each communication depending on the distance the audio source is to the user. After the communication is weighed by the weighing engine, the communication can be transmitted to the user, at step 265.

It should be understood by those skilled in the art that none, any, or all of steps 200, 210, 220, 230, 240, or 250 may be applied to an audio communication. For example, if none of steps 200, 210, 220, 230, 240, or 250 are applicable, any audio communication can be transmitted without adjustment, at step 270. Moreover, if a determination is made that, e.g., step 200 is not applicable, further determinations can be made as to the applicability of additional steps, e.g., step 210. Likewise, if step 210 is not applicable, further determinations can be made as to the applicability of additional steps, e.g., step 220. Similar determinations can be made for any or all of steps 200, 210, 220, 230, 240, or 250.

FIG. 3 illustrates an exemplary process, which may be used to determine how loudly an incoming communication is transmitted to a user. More specifically, at step 310, an audio source is compared to a user or VU defined list of audio sources and/or groups that have been given precedence by the user or VU. Next, a determination can be made as to whether the audio source is part of the user's list, at step 320. If the audio source is not in the user's list then a proximity curve is applied to the incoming communication, at step 330. If the audio source is in the user's list, the volume of the incoming communication is not affected by the proximity curve. At step 340, a determination can be made as to whether a communication of equal volume is already being transmitted. If more than one communication is being transmitted at the same time then the initial communication may be given precedence over the interrupting communication, at step 350. This may occur by decreasing the volume of the interrupting communication or increasing the volume of the initial communication.

After the volume of each incoming communication has been calculated, the audio source can be compared against user settings to determine whether a specific audio channel is designated for the audio source's communications, at step 360. A user can designate an audio channel for one or more audio sources using an inclusive or exclusive list that specifies which audio source's communications should be transmitted to a left channel, a right channel, and/or other channel, etc. Embodiments may also allow users to direct specific communications to a first channel, and all other communications to one or more other channels. Once it is determined that a channel is specified then the communication is directed to the appropriate audio channel, at step 370. At step 380, the incoming communication can be transmitted to the user at the determined volume and audio channel.

Proximity Curve

Figure 4:
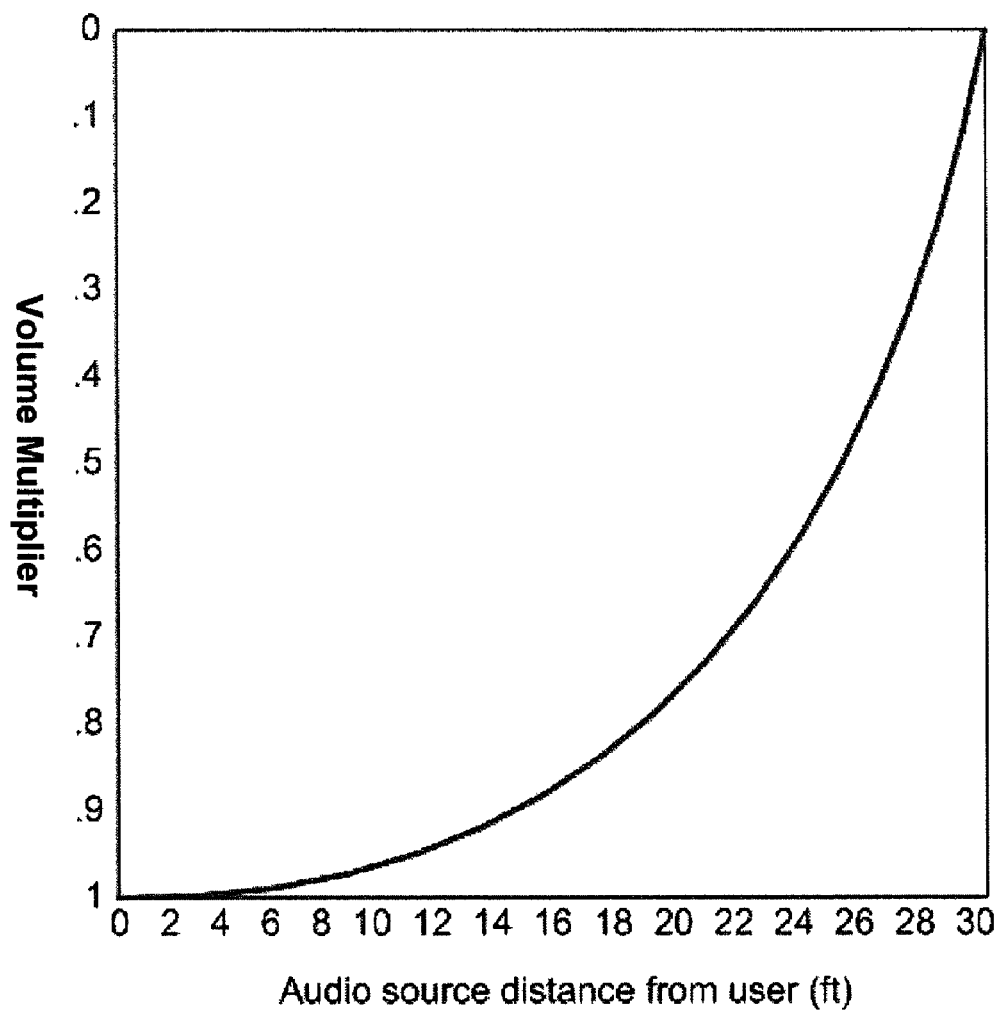
FIG. 4 shows an exemplary proximity curve in accordance with aspects of the invention.

FIG. 4 further illustrates an exemplary proximity curve in accordance with embodiments of the present invention. The proximity curve can be used to define default volume levels for all incoming voice communications based on the distance the audio source is to the user. This may be done by designating a volume multiplier for voice transmissions originating over a set distance beyond the user's current position. Embodiments may allow the user to designate the volume multiplier for a curve, thereby allowing users to customize how distance affects the volume of various incoming communications.

A volume multiplier can be used to quantify the volume of a communication occurring within a set distance. The volume multiplier can be reduced as the audio source becomes farther away from the user. The reduction can be gradual, like the curve shown in FIG. 4. However, embodiments may also utilize stepped volume multipliers that apply a specific volume multiplier to all communications occurring within a first range, another specific volume multiplier to communications occurring within a second range, etc. Additional embodiments may utilize proximity curves that do not monotonically increase or decrease. For example, a proximity curve may have a tall hump at 20 feet in order to focus on certain communications and a deep valley for noise and voice suppression at another distance.

The proximity curve in FIG. 4 shows a volume multiplier applied to audio sources located at distances ranging between 0 and 30 feet from the user. As illustrated, a zero multiplier may be applied to users that are at 30 feet or more from user. This would reduce the volume of all communications from users at 30 feet and beyond to zero. Additionally, the proximity curve would, e.g., apply a 0.7 volume multiplier to an audio source's communicating from 22 feet away from the user, thereby allowing the user to hear the audio source's communication at 70% of the initial volume in which the communication took place.

Figure 5:
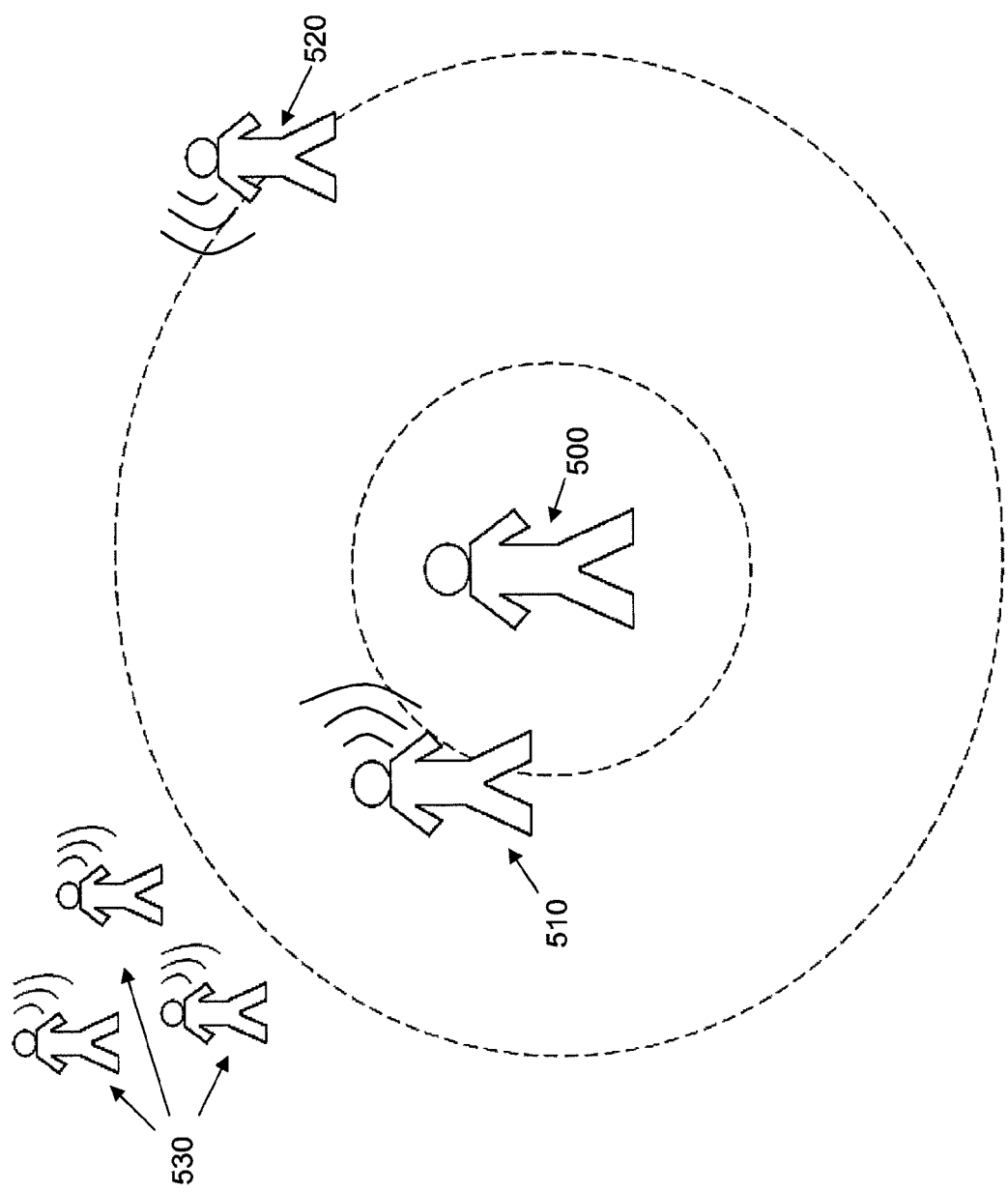
FIG. 5 shows an illustrative example using a proximity curve in accordance with aspects of the invention.

FIG. 5 shows an illustrative example using a proximity curve in accordance with embodiments of the invention. In particular, FIG. 5 includes a user 500 participating in the VU. FIG. 5 also includes a plurality of avatars 510, 520, and 530 that are various distances away from the user 500. For example, an avatar 510 may be 15 feet away from the user 500, another avatar 520 may be 25 feet away from the user 500, and additional avatars 530 may be over 30 feet away from the user 500. Thus, when applying a proximity curve to communications from the avatars 510, 520, and 530, communications from avatar 510 will sound louder to the user 500 than communications from avatar 520. Similarly, communications from avatar 520 will sound louder to the user 500 than communications from avatars 530.

Additional Embodiments

While a number of audio modifications have been described, it should be understood by those skilled in the art that additional modifications may be applied to incoming communications. These additional modifications may be specific to a user and/or specific to one or more locations within a VU. For example, embodiments can modify communications between one or more avatars while the avatars are at a conference center. This may be performed, e.g., to automatically make the conference audio source the predominate audio communication within the conference center, thereby allowing the user to focus on a desired audio source. These modifications may be performed by one or more of the user, the VU, the audio source, a group member, a group or VU administrator, a location owner, etc. These modified settings may be remembered and restored when a user re-enters the location.

Further audio modifications may optionally be bought and sold as pluggable, exchangeable acoustic modules. These modules may come with an avatar or may be pluggable such that an avatar can achieve certain modifications to improve the avatar's ability to hear communications within a VU. These modules may be used, e.g., to help the hearing impaired by increasing the volume of an incoming communication and/or focusing a user's attention to the most important communication by removing extraneous communications. The degree of importance can be determined, e.g., by the weight of the communication. In addition to helping the hearing impaired, acoustic modules may be used by non-impaired users to give their avatars enhanced cognitive abilities. For example, acoustic modules may be used to give an avatar superhuman hearing abilities in various scenarios.

Any number of applicable audio modifications may be applied to an incoming communication. These audio modifications can apply while the user is participating in a region within a VU, is teleporting between locations within a VU, and/or while the user is outside of a VU. For example, audio modifications can be applied to incoming communications while the user is teleporting from a first location to a second location within the VU. If proximity is considered when a user's avatar is teleporting between locations, then a determination of how proximate an audio source is to a user may be based on the user's location prior to teleportation, the user's anticipated location post teleportation, the location of the user at any point during the teleportation, etc.

Embodiments may also apply audio modifications to communications while the user is outside of a VU. For example, a user working on a computer but not logged into a VU may continue to send and receive communications. These communications can be modified and transmitted to the user as if the user were in the VU. Therefore, the user can give precedence to designated communications and increase and/or decrease the volume for certain types of communications relative to other types of communications. Since the user is outside of the VU, embodiments may or may not use proximity to determine how loudly a communication should be transmitted. Those embodiments utilizing proximity may determine how proximate an audio source is to a user based on, e.g., the audio source's proximity to a designated location within the VU. This designated location can be chosen by the user or by the VU, and may have a default such as the location at logoff.

While the invention has been described in terms of embodiments, those skilled in the art will recognize that the invention can be practiced with modifications and in the spirit and scope of the appended claims.

What is claimed is:

1. A system comprising:
    a module configured to detect one or more parameters applicable to an incoming audio communication;
    a weighing engine configured to weigh the one or more parameters and obtain a weighted volume; and
    a module configured to provide the weighted volume such that a user participating in a virtual universe can be provided with an audio at a certain volume.

2. The system of claim 1, wherein the one or more parameters include at least one of: a user identification parameter, a group identification parameter, an inventory item possession parameter, a display parameter, a user declaration parameter, a timing parameter, a listening device channel setting parameter, and a proximity parameter.

3. The system of claim 2, wherein the proximity parameter applies a volume multiplier to the incoming communication, the volume multiplier configured to change relative to a distance between a source of an incoming communication and a recipient of the incoming communication.

4. The system of claim 2, wherein the user declaration parameter includes at least one of pressing a designated key, typing a command, and sounding an alert and/or warning.

5. The system of claim 2, wherein the listening device channel setting parameter is configured to designate a channel on which to transmit the incoming communication.

6. The system of claim 2, wherein the timing parameter is configured to determine whether the incoming communication is interrupting an existing communication.

7. The system of claim 2, further comprising an acoustic module configured to provide additional parameters.

8. The system of claim 1, wherein the weighing engine is configured to assign weights to at least one of the one or more parameters as a function of at least one of: a user, the virtual universe, a source of the incoming communication, a group member, a group, a virtual universe administrator, a service provider, and a location owner.

9. The system of claim 1, wherein the weighted volume is an average of the one or more parameters.

10. A method for deploying an application for modifying audio communications, comprising:
    providing a computer infrastructure being operable to:
        determine an initial volume of an incoming communication;
        determine a final volume of the incoming communication by adjusting the initial volume according to one or more factors, which are configured to be customized by at least one of: a virtual universe and a user; and
        transmit the final volume to the user.

11. The method of claim 10, wherein the one or more weighted factors include at least one of: a user identification parameter, a group identification parameter, an inventory item possession parameter, a display parameter, a user declaration parameter, a timing parameter, a listening device channel setting parameter, and a proximity parameter.

12. The method of claim 10, wherein the computer infrastructure is at least one of:
    supported, deployed, maintained, and created by a service provider.

* * * * *